United States Patent
Lu et al.

(10) Patent No.: US 11,822,581 B2
(45) Date of Patent: Nov. 21, 2023

(54) REGION INFORMATION PROCESSING METHOD AND APPARATUS

(71) Applicant: BEIJING BAIDU NETCOM SCIENCE TECHNOLOGY CO., LTD., Beijing (CN)

(72) Inventors: Xinjiang Lu, Beijing (CN); Dejing Dou, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 1 day.

(21) Appl. No.: 17/706,706

(22) Filed: Mar. 29, 2022

(65) Prior Publication Data

US 2022/0222278 A1 Jul. 14, 2022

(30) Foreign Application Priority Data

May 19, 2021 (CN) .......................... 202110547433.9

(51) Int. Cl.
*A61N 1/00* (2006.01)
*G06F 16/28* (2019.01)

(52) U.S. Cl.
CPC ................... *G06F 16/285* (2019.01)

(58) Field of Classification Search
CPC ................................ G06F 16/285
USPC ................................. 707/600–899
See application file for complete search history.

(56) References Cited

U.S. PATENT DOCUMENTS

| | | | |
|---|---|---|---|
| 2015/0160838 A1* | 6/2015 | Shirabe | G06F 3/04845 715/765 |
| 2015/0363700 A1 | 12/2015 | Zheng et al. | |
| 2016/0350337 A1 | 12/2016 | Mielenhausen | |
| 2021/0108941 A1 | 4/2021 | Lu et al. | |

FOREIGN PATENT DOCUMENTS

| | | |
|---|---|---|
| CN | 107609107 A | 1/2018 |
| CN | 110968617 A | 4/2020 |
| CN | 110986996 A | 4/2020 |

OTHER PUBLICATIONS

Hu, "Theory Definition and Internal Mechanism of Industry Symbiosis," Shanghai Academy of Social Sciences, Sep. 30, 2008 (12 pages).

(Continued)

*Primary Examiner* — Isaac M Woo
(74) *Attorney, Agent, or Firm* — Tucker Ellis LLP

(57) ABSTRACT

The present disclosure provides a region information processing method and apparatus, and relates to the field of artificial intelligence in computer technologies. The specific implementation is: acquiring a first distance between a first region and a second region, a first object set included in the first region, and a second object set included in the second region; determining spatial dependency information between the first region and the second region according to the first distance; determining object dependency information between the first region and the second region according to the first object set and the second object set; and determining a symbiosis between the first region and the second region according to the spatial dependency information and the object dependency information.

19 Claims, 7 Drawing Sheets

(56) References Cited

OTHER PUBLICATIONS

Huang, et al., "Analysis of Rail Transit Industry Cluster Based on Improved PageRank Algorithm," Journal of Transportation Engineering and Information, Jun. 12, 2020 (10 pages).
Notice of registration and Notice of granting invention patent right of corresponding Chinese Application No. 202110547433.9, dated Jul. 21, 2023, 14 pages.
Mohammed Golam Sarwer et al., "Adaptive Search Area Selection of Variable Block-Size Motion Estimation of H.264/AVC Video Coding Standard", 2009 11th IEEE International Symposium on Multimedia, Dec. 31, 2009, 6 pages.
Qiao Xue et al., "Simulation of POI Data Generation for Dynamic Information of Building Coverage Area", Computer Simulation, No. 08, Aug. 15, 2020, 6 pages.

* cited by examiner

REGION INFORMATION PROCESSING METHOD AND APPARATUS

CROSS-REFERENCE TO RELATED APPLICATIONS

This application claims priority to Chinese Patent Application No. 202110547433.9, filed on May 19, 2021, which is hereby incorporated by reference in its entirety.

TECHNICAL FIELD

The present disclosure relates to the field of artificial intelligence in computer technology and, in particular, to a region information processing method and apparatus.

BACKGROUND

Symbiosis is a concept in the living nature, which refers to a two-way relationship between two species in the living nature that is mutually dependent and mutually beneficial. In an urban environment, there is also an interdependent relationship between different regions. If the interdependent relationship between different regions can be quantified, it will be of great significance for enriching content in maps, optimizing traffic scheduling, commercial location recommendation, comprehensive urban governance and other service scenarios.

At present, there is no effective solution to quantify the interdependent relationship between different regions.

SUMMARY

The present disclosure provides a region information processing method and apparatus.

According to a first aspect of the present disclosure, a region information processing method is provided, the method includes:

acquiring a first distance between a first region and a second region, a first object set included in the first region, and a second object set included in the second region;

determining spatial dependency information between the first region and the second region according to the first distance;

determining object dependency information between the first region and the second region according to the first object set and the second object set; and determining a symbiosis between the first region and the second region according to the spatial dependency information and the object dependency information.

According to a second aspect of the present disclosure, a region information processing apparatus is provided, the apparatus includes:

an acquiring module, configured to acquire a first distance between a first region and a second region, a first object set included in the first region, and a second object set included in the second region;

a first determining module, configured to determine spatial dependency information between the first region and the second region according to the first distance;

a second determining module, configured to determine object dependency information between the first region and the second region according to the first object set and the second object set; and a processing module, configured to determine a symbiosis between the first region and the second region according to the spatial dependency information and the object dependency information.

According to a third aspect of the present disclosure, an electronic device is provided, which includes:

at least one processor; and a memory in communicational connection with the at least one processor; where the memory stores instructions executable by the at least one processor, and the instructions are executed by the at least one processor to enable the at least one processor to execute the method described in the first aspect.

According to a fourth aspect of the present disclosure, a non-transitory computer-readable storage medium having computer instructions stored thereon is provided, where the computer instructions are used to cause a computer to execute the method described in the first aspect.

According to a fifth aspect of the present disclosure, a computer program product is provided, the computer program product includes a computer program, the computer program is stored in a readable storage medium, at least one processor of an electronic device may read the computer program from the readable storage medium, and the at least one processor executes the computer program to cause the electronic device to execute the method described in the first aspect.

The technology according to the present disclosure solves the problem that the interdependent relationship between different regions cannot be quantified.

It should be understood that the content described in this section is not intended to identify essential or significant features of the embodiments of the present disclosure, and is not intended to limit the scope of the present disclosure. Other features of the present disclosure will become easy to understand by the following description.

BRIEF DESCRIPTION OF DRAWINGS

The accompanying drawings are used for a better understanding of the solution, and do not form a limitation of the present disclosure, in which.

DESCRIPTION OF EMBODIMENTS

Exemplary embodiments of the present disclosure are described below with reference to the accompanying drawings, and include various details of the embodiments of the present disclosure to facilitate understanding, which should be considered as merely exemplary. Therefore, those ordinary skilled in the art should recognize that various changes and modifications may be made to the embodiments described herein without departing from the scope and spirit of the present application. Also, for clarity and conciseness, descriptions of well-known functions and structures are omitted in the following description.

In order to better understand the technical solutions of the present disclosure, firstly, the related technologies involved in the present disclosure will be further described in detail.

Symbiosis is a concept in the living nature, which refers to a two-way relationship between two species in the living nature that is mutually dependent and mutually beneficial. These relationships may be long-term, including material contact or biochemical links. Typical cases may include, e.g., sea anemones and clown fish, buffaloes and cow starlings, etc.

At present, there are also interdependent links among different regions in the urban environment, where the region may be, for example, a community, or a block, etc. The specific division of the region is not limited in this embodiment.

If the interdependent relationship between different regions can be quantified, it will be of great significance to enriching content of maps, optimizing traffic scheduling, commercial location recommendation, comprehensive urban governance and other service scenarios.

At present, there is no effective solution to quantify the interdependent relationship between different regions. Therefore, the present disclosure proposes the following technical idea: by analyzing a complementary relationship of function distribution between different regions, the interdependent relationship between different regions is quantified, in combination with spatial features, from the perspective of supply relationships in an industrial chain, so as to obtain a symbiosis between different regions.

Figure 1:
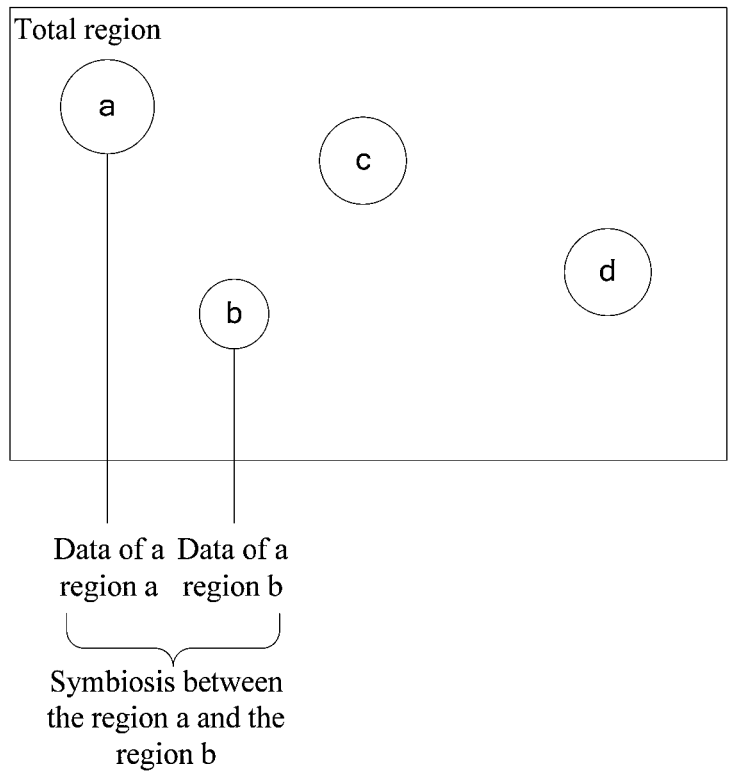
FIG. 1 is a schematic diagram of a scenario for a region information processing method provided by an embodiment of the present disclosure.

For example, a scenario of a region information processing method provided by the present disclosure may be described first with reference to FIG. 1. FIG. 1 is a schematic diagram of the scenario for the region information processing method provided by an embodiment of the present disclosure.

As shown in FIG. 1, there is currently a total region, and the total region may include a plurality of regions, for example, in FIG. 1, the total region includes a region a, a region b, a region c, and a region d. Understandably, the implementation of the total region and each divided region shown in FIG. 1 is merely an exemplary description for illustrating the situation.

In an actual implementation process, the total region may be understood as, for example, an urban region. As for the specific range and specific division of the urban region, it may be selected according to actual needs, such as the region a, the region b, etc. divided in the urban region, which may be, for example, blocks, or communities, etc. The specific implementation of the division of the region is also not limited in the embodiments, which may be selected according to actual needs.

In this embodiment, the symbiosis between any two regions may be determined, for example, the symbiosis between the region a and the region b may be determined, and the symbiosis between the region a and the region c may also be determined, and so on. For example, taking the symbiosis between the region a and the region b as an example, for example, relevant data of the region a and relevant data of the region b may be acquired, and then the symbiosis between the region a and the region b may be determined according to the data of the region a and the data of the region b.

The implementation of determining the symbiosis between different regions is described below in conjunction with specific embodiments. It is worth noting that the executive body of the embodiments in the present disclosure may be a device with a data processing function, such as a server, a processor, a microprocessor, etc. The specific implementation of the executive body is not particularly limited in the present disclosure, as long as it is a device with a data processing function.

Figure 2:
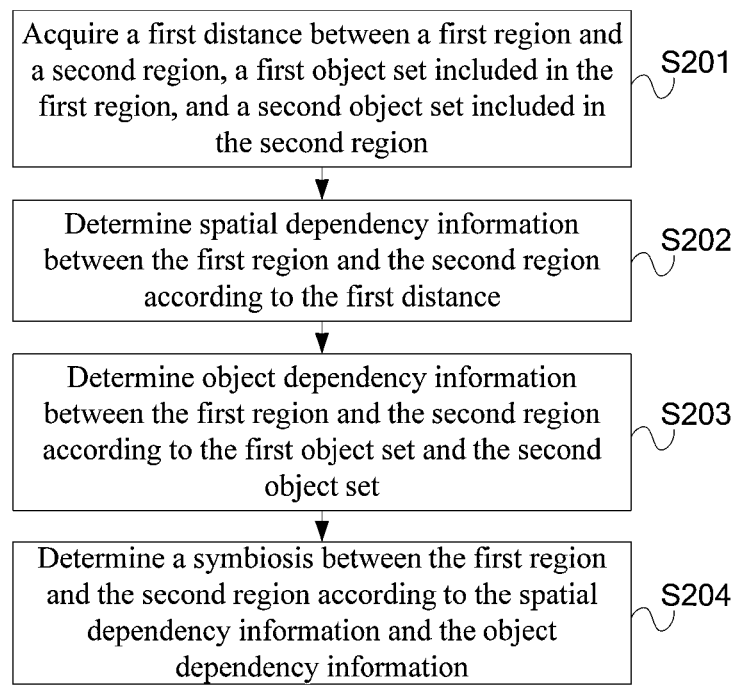
FIG. 2 is a first flowchart of a region information processing method provided by an embodiment of the present disclosure.

FIG. 2 is a flowchart of a region information processing method provided by an embodiment of the present disclosure.

As shown in FIG. 2, the method includes:

S201. Acquire a first distance between a first region and a second region, a first object set included in the first region, and a second object set included in the second region.

In this embodiment, the symbiosis between the first region and the second region needs to be determined. The first region and the second region may be any two different regions, which is not limited in this embodiment.

In this embodiment, the first distance between the first region and the second region may be acquired, the first object set included in the first region may be acquired, and the second object included in the second region may be acquired.

Where the first distance may be, for example, a spherical distance between coordinates of region centers of the two regions, or it may also be a Euclidean distance, etc. In an actual implementation process, the first distance may be any possible physical space distance, which is not limited in this embodiment.

Besides, the object mentioned in this embodiment, for example, may be understood as a point of interest (POI). In a geographic data system, a POI may be a house, a store, a mail box, a bus stop, etc.

Therefore, in this embodiment, the acquiring the first object set included in the first region may be understood as acquiring a set of points of interest included in the first region, and the acquiring the second object set included in the second region may be understood as acquiring a set of points of interest included in the second region.

When acquiring the above-described data, in a possible implementation, the first distance, the first object set, the second object set, etc. may all be stored in map data, and the above data may be acquired from the map data. For instance, the first distance between the first region and the second region is acquired from the map data, and the first object set and the second object set are acquired from the map data.

In a possible implementation of acquiring the object set from the map data, for example, directly acquiring the points of interest included in a range of each region, so as to obtain the first object set and the second object set; or, acquiring positions of all points of interest in the urban region where the first region and the second region are located, and then matching the positions of the points of interest and the range of the first region and the range of the second region, so as to determine the first object set included in the first region and the second object set included in the second region.

In another possible implementation of acquiring the above-described data, storing the above-described data, for example, in a preset device, and then acquiring the first distance, the first object set and the second object set according to a region identification of the first region and a region identification of the second region from the preset device.

The specific implementation of acquiring the above-described data is not limited in this embodiment, which may be selected according to actual needs.

S202. Determine spatial dependency information between the first region and the second region according to the first distance.

After acquiring the various above-described data, it is possible to determine the spatial dependency information between the first region and the second region according to the first distance therein.

Understandably, there is a certain correlation between the symbiosis and distance between the two regions. In a possible implementation, the closer the distance between the two regions, the stronger the symbiosis. Correspondingly, the further the distance between the two regions, the weaker the symbiosis.

Therefore, in this embodiment, the spatial dependency information between the first region and the second region may be determined first according to the first distance between the first region and the second region, where the spatial dependency information may be used to indicate, for example, a level of influence of the distance between the two regions in determining the symbiosis.

In a possible implementation, for example, the first distance may be processed according to a first preset function, so as to determine the spatial dependency information between the first region and the second region; or, the first distance may also be used as an input of a first preset model, so as to determine the spatial dependency information between the first region and the second region, which is not limited in this embodiment, as long as the spatial dependency information between the first region and the second region is determined according to the first distance.

S203. Determine object dependency information between the first region and the second region according to the first object set and the second object set.

In this embodiment, the object dependency relationship between the first region and the second region may be determined according to the first object set and the second object set. The object dependency relationship may be used to indicate, for example, the level of influence of the points of interest between the two regions in determining the symbiosis.

For instance, there is a shopping mall a in the first region, and an office building b in the second region. Employees in the office building b often go to eat in the shopping mall a after work. Therefore, there is a certain interdependent relationship of the points of interest between different regions, the object dependency information in this embodiment is used to quantify this interdependent relationship.

In a possible implementation, for example, the first object set and the second object set may be processed according to a second preset function, so as to determine the object dependency information between the first region and the second region; or, the first object set and the second object set may also be used as an input of a second preset model, so as to determine the object dependency information between the first region and the second region, which is not limited in this embodiment, as long as the object dependency information is determined according to the first object set and the second object set.

S204. Determine a symbiosis between the first region and the second region according to the spatial dependency information and the object dependency information.

After determining the spatial dependency information and the object dependency information, it is possible to determine the symbiosis between the first region and the second region according to the spatial dependency information and the object dependency information.

Understandably, the spatial dependency information may indicate an influence factor of the distance between the first region and the second region, the object dependency information may indicate the influence factor of the points of interest between the first region and the second region, and the distance and points of interest may effectively indicate the symbiosis between regions, therefore, according to these two parts of information, the symbiosis between the first region and the second region may be accurately and effectively determined.

In a possible implementation, the symbiosis between the first region and the second region may be a specific value, therefore, the symbiosis in this embodiment may also be specifically a symbiotic level, and the symbiosis may indicate the dependency relationship and the mutual influence relationship between the first region and the second region, etc.

When determining the symbiosis between the first region and the second region according to the spatial dependency information and the object dependency information, for example, the spatial dependency information and the object dependency information may be processed according to a third preset function, so as to determine the symbiosis between the first region and the second region; or, the spatial dependency information and the object dependency information may also be input into a third preset model, so as to obtain the symbiosis between the first region and the second region. The specific implementation of determining the symbiosis is not limited in this embodiment, as long as it is determined according to the spatial dependency information and the object dependency information.

Therefore, in this embodiment, the quantification of the symbiosis between two different regions may be realized accurately and effectively based on the above-described process.

The region information processing method provided by the embodiments of the present disclosure includes: acquiring a first distance between a first region and a second region, a first object set included in the first region and a second object set included in the second region; determining spatial dependency information between the first region and the second region according to the first distance; determining object dependency information between the first region and the second region according to the first object set and the second object set; and determining a symbiosis between the first region and the second region according to the spatial dependency information and the object dependency information. By determining of the spatial dependency information between the two regions according to the distance between the first region and the second region, and determining the object dependency information according to points of interest corresponding to the first region and points of interest corresponding to the second region, and finally obtaining the symbiosis between the first region and the second region based on the spatial dependency information and the object dependency information, the quantification of the symbiosis between the two regions may be realized accurately and effectively from the perspective of the distance between the regions and the dependency relationship of functions between the regions.

Figure 3A:
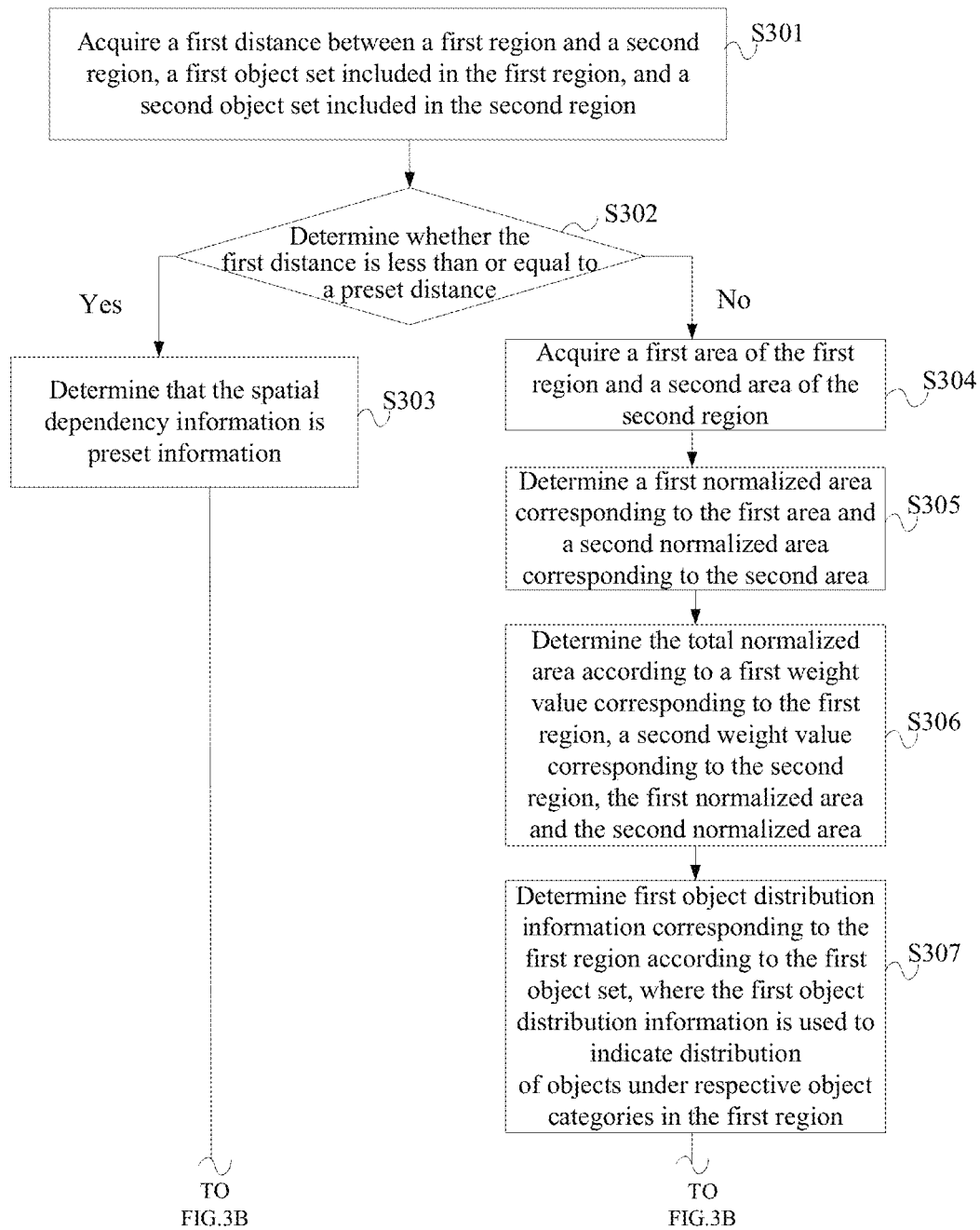
FIG. 3A and FIG. 3B are a second flowchart of a region information processing method provided by an embodiment of the present disclosure.
Figure 3B:
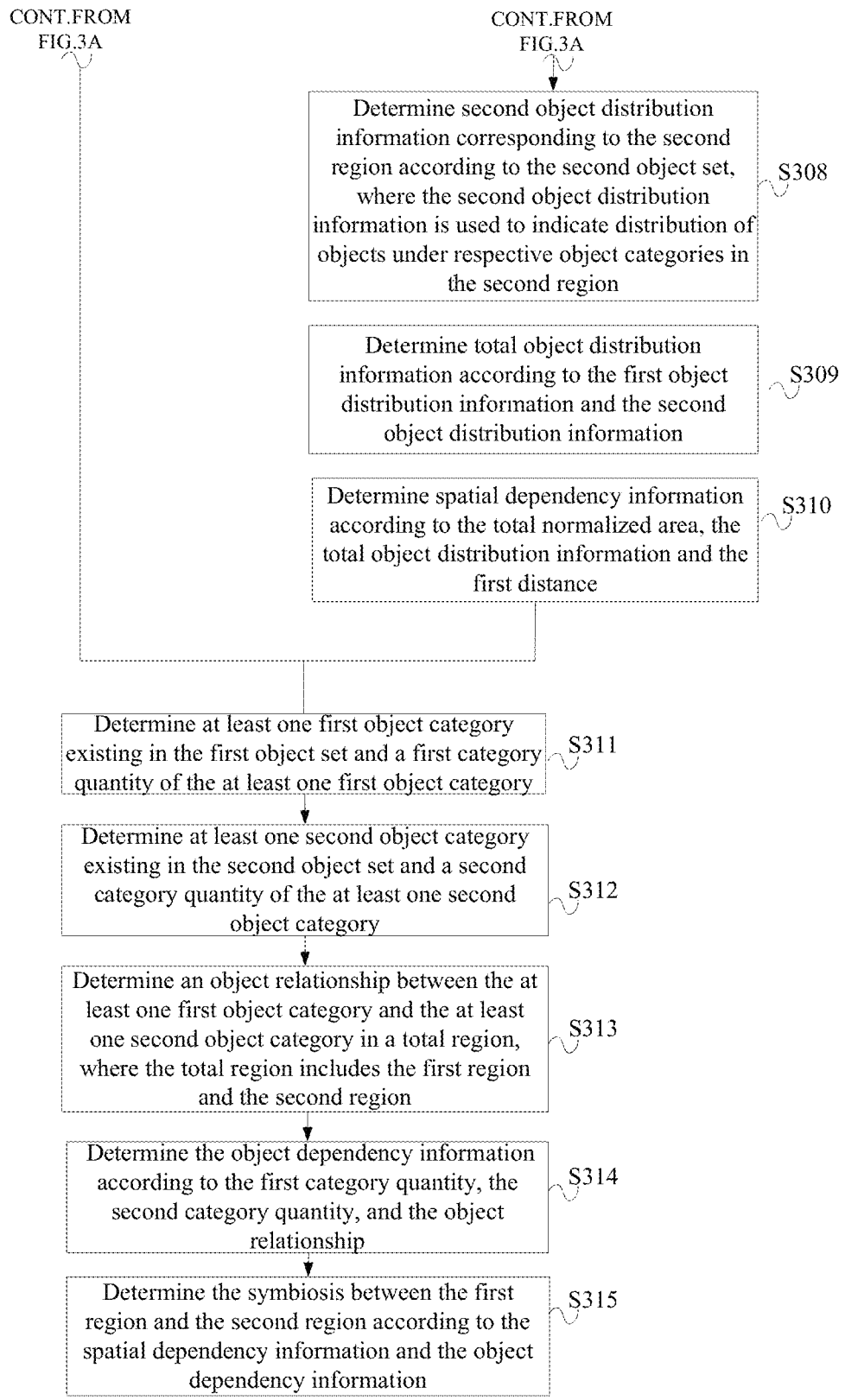
Figures 4, 5:
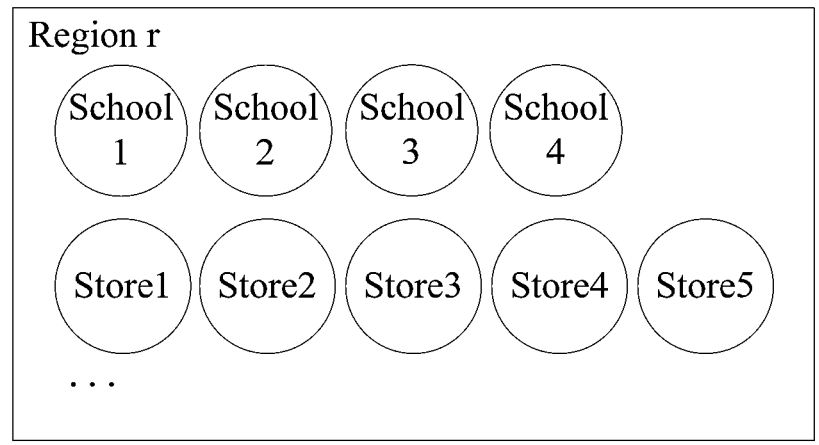
FIG. 4 is a schematic implementation diagram of function categories corresponding to a region provided by an embodiment of the present disclosure.
FIG. 5 is a possible schematic implementation diagram of an object relationship provided by an embodiment of the present disclosure.

On the basis of the above-described embodiments, the region information processing method provided by the embodiments of the present disclosure will be described in further detail below with reference to FIGS. 3 to 5. FIG. 3A and FIG. 3B are a second flowchart of a region information processing method provided by an embodiment of the present disclosure. FIG. 4 is a schematic implementation diagram of function categories corresponding to a region provided by an embodiment of the present disclosure, and FIG. 5 is a possible schematic implementation diagram of an object relationship provided by an embodiment of the present disclosure.

As shown in FIG. 3A and FIG. 3B, the method includes:

S301. Acquire a first distance between a first region and a second region, a first object set included in the first region, and a second object set included in the second region.

Where the implementation of S301 is similar to the implementation of S201.

S302. Determine whether the first distance is less than or equal to a preset distance, if yes, execute S303, if not, execute S304.

In this embodiment, firstly, the implementation of determining the spatial dependency information is described in detail in conjunction with S302-S310. When determining the spatial dependency information, it is determined according to the first distance between the first region and the second region.

In this embodiment, the symbiotic level and the distance between regions are, for example, positively correlated. The closer the distance, the higher the symbiotic level, and the farther the distance, the lower the symbiotic level. However, attenuation of the symbiotic level should not be linear attenuation. As the distance increases, the attenuation of the symbiotic level should become slower and slower.

Therefore, in a possible implementation, for the first distance greater than the preset distance, and the first distance less than or equal to the preset distance, the implementation of determining the spatial dependency information is not the same.

Therefore, it may be firstly determined whether the first distance is less than or equal to the preset distance, where the specific implementation of the preset distance may be selected according to actual needs.

For example, the implementation of determining the spatial dependency information according to the first distance may satisfy the following formula 1:

$$\zeta(a, b) = \begin{cases} 1, & \text{distance} \leq \theta_d \\ d(a, b)^{-\alpha(a,b)}, & \text{distance} > \theta_d \end{cases} \quad \text{Formula 1}$$

Among them, distance is the first distance, $\theta_d$ is the preset distance, $d(a, b)$ represents a physical space distance between a region a and a region b (for example, a Euclidean distance, a spherical distance, etc., which may be considered as the above-described the first distance), $\alpha(a, b)$ represents a power law attenuation degree of the physical distance between the region a and the region b, a may represent, for example, the first region, b may represent, for example, the second region, $\zeta(a, b)$ represents the spatial dependency information between the region a and the region b.

S303. Determine that the spatial dependency information is preset information.

In a possible implementation, if it is determined that the first distance is less than or equal to the preset distance, it means that the distance between the two regions is not very far, so it may be determined that the spatial dependency information is the preset information.

In this embodiment, since the quantification of the symbiosis is sought to be implemented, the spatial dependency information in this embodiment may be numerical information, correspondingly, the preset information therein may be, for example, a preset value, for instance, the preset information may be the preset value 1 described in the above formula 1, or the preset information may be any value.

S304. Acquire a first area of the first region and a second area of the second region.

In another possible implementation, if it is determined that the first distance is greater than the preset distance, it means that the distance between the two regions is relatively far, and the spatial dependency information between the first region and the second region may be, for example, defined as a power function of the distance between two regions, which is $d(a, b)^{-\alpha(a,b)}$ described in the above formula 1.

Therefore, in this case, to determine the spatial dependency relationship between the first region and the second region, it is necessary to determine the power law attenuation degree $\alpha(a, b)$ of the physical distance between the first region and the second region.

In a possible implementation, the power law attenuation degree $\alpha(a, b)$ of the physical distance between the first region and the second region may satisfy, for example, the following formula 2:

$$\alpha(a,b)=\alpha_0-\lambda\times\rho(a,b)+(1-\lambda)\times\eta(a,b) \quad \text{Formula 2}$$

Among them, $\alpha(a, b)$ is the power law attenuation degree, $\alpha_0$ is a constant, and its value is, for example, between 1.5 and 2, $(1.5 \leq \alpha_0 \leq 2)$, for example, its default value may be 1.5; $\lambda$ is a weight coefficient, for example, its default value may be 0.5; where $\rho(a, b)$ represents a total normalized area of the first region and the second region, and $\eta(a, b)$ represents total object distribution information between the first region and the second region.

Based on the above introduction, it may be determined that when the first distance is determined to be greater than the preset distance, in order to determine the spatial dependency information between the first region and the second region, it is necessary to determine the power law attenuation degree $\alpha(a, b)$ of the physical distance between the first region and the second region, and the power law attenuation degree $\alpha(a, b)$ is determined according to the total normalized area $\rho(a, b)$ and the total object distribution information $\eta(a, b)$.

Therefore, it is necessary to determine the total normalized area $\rho(a, b)$ and the total object distribution information $\eta(a, b)$. In the following, the implementation of the total normalized area $\rho(a, b)$ will be described in conjunction with S304-S306.

In a possible implementation, the total normalized area $\rho(a, b)$ may satisfy, for example, the following formula 3:

$$\rho(a,b)=0.5\times\iota(a)+0.5\times\iota(b) \quad \text{Formula 3}$$

Among them, $\iota(a)$ is a normalized area value of the region a, $\iota(b)$ is a normalized area value of the region b, and $\rho(a, b)$ is the total normalized area of the first region and the second region.

Based on these, when determining the total normalized area ρ(a, b), it is necessary to determine the normalized area of the first region and the normalized area of the second region. In a possible implementation, the implementation of the normalized area may satisfy the following formula 4:

$$\iota(r) = \frac{\log(1 + \text{area}(r))}{\log\left(1 + \max_{r \in R}\text{area}(r)\right)} \quad \text{Formula 4}$$

Among them, r represents the region, which may be the first region or the second region, area(r) represents the area of the region r, R is a region set of the city where the region r is located, $$\max_{r \in R}\text{area}(r)$$

represents the largest region in the region set R.

Based on the above formula 4, it may be determined that, in order to determine the normalized area of the first region and the normalized area of the second region, it is necessary to determine the area of the first region and the area of the second region.

Therefore, in this embodiment, the first area of the first region and the second area of the second region may be acquired. In a possible implementation, for example, the area of the first region may be acquired from map information, and the area of the second region may be acquired from map information.

Alternatively, the first area of the first region may also be acquired from a preset device, and the second area of the second region may be acquired from the preset device, and relevant data of the regions may be stored in the preset device.

S305. Determine a first normalized area corresponding to the first area and a second normalized area corresponding to the second area.

After acquiring the first area of the first region, it is possible to determine the first normalized area corresponding to the first area according to the first area.

For example, in conjunction with the above-described formula 4, the first area of the first region may be substituted into the above formula 4, so as to determine the first normalized area ι(a) corresponding to the first area.

Besides, after acquiring the second area of the second region, it is possible to determine the second normalized area corresponding to the second area according to the second area.

For example, in conjunction with the above-described formula 4, the second area of the second region may be substituted into the above formula 4, so as to determine the second normalized area ι(b) corresponding to the second area.

S306. Determine the total normalized area according to a first weight value corresponding to the first region, a second weight value corresponding to the second region, the first normalized area and the second normalized area.

After determining the first normalized area ι(a) and the second normalized area ι(b), for example, determining, based on the above-described formula 3, the total normalized area ρ(a, b) according to the first weight value corresponding to the first region, the second weight value corresponding to the second region, the first normalized area and the second normalized area.

In the above formula 3, the first weight value is 0.5, and the second weight value is also 0.5. In an actual implementation process, the specific implementation of the first weight value and the second weight value may be selected and expanded according to actual needs, which is not particularly limited in this embodiment.

Understandably, the total normalized area ρ(a, b) in this embodiment may indicate, for example, the area correlation between the region a and the region b.

S307. Determine first object distribution information corresponding to the first region according to the first object set, where the first object distribution information is used to indicate distribution of objects under respective object categories in the first region.

After introducing the implementation of the total normalized area ρ(a, b) above, in the following, the implementation of determining the total object distribution information η(a, b) will be introduced in combination of S307-S309.

In a possible implementation, the total object distribution information η(a, b) may satisfy, for example, the following formula 5:

$$\eta(a,b) = 0.5 \cdot \delta(a) + 0.5 \cdot \delta(b) \quad \text{Formula 5}$$

Among them, δ(a) represents the object distribution information corresponding to the region a, δ(b) represents the object distribution information corresponding to the region b.

Here is a brief introduction to the function category. Based on the above introduction, it may be determined that the POI in this embodiment represents an entity with geographic information in various types of physical world in the city, such as a store, a school, and a building, etc.

In this embodiment, the POI is denoted as p, the function category of a POI is denoted as γ (p), and the function category of a POI denoted as γ (p) represents a service content type of this geographic entity, for instance, the current POI may include a first elementary school, a second elementary school, and a third elementary school, all of which may be classified into a function category "school"; again, for instance, the current POI may include a store 1, a store 2, and a store 3, all of which may be classified into a function category "store". The classification of specific function categories may be selected according to actual needs, which is not particularly limited in this embodiment.

Based on the above-described content, the implementation of the object distribution information δ(r) of the region r may satisfy, for example, the following formula 6:

$$\delta(r) = -\Sigma_{i \in F_r} z_i \log z_i, F_r = \{\gamma(p) | p \in r\} \quad \text{Formula 6}$$

Among them, $F_r$ represents a function category set of the region r, $z_i$ represents the frequency at which the function category i appears in the region r, and δ(r) represents the object distribution information of the region r, and δ(r) may be understood as, for example, entropy of distribution of function categories in the region r.

For example, the currently mentioned frequency at which the function category i appears in the region r may be understood with reference to FIG. 4. Assuming that the current function category includes school and store, the region r includes a school 1, a school 2, a school 3, and a school 4, that is, in the region r, the function category "school" appears 4 times in the region r, so the frequency at which the function category "school" appears in the region r may be, for example, 4.

Similarly, referring to FIG. 4, the region r includes a store 1, a store 2, a store 3, a store 4, and a store 5, that is, in the region r, the function category "store" appears 5 times in the region r, then the frequency at which the function category "store" appears in the region r may be, for example, 5.

Based on the above introduction, it may be determined that, in order to determine the total object distribution information η(a, b), it is necessary to determine the first object distribution information δ(a) corresponding to the first region, and to determine the second object distribution information δ(b) corresponding to the second region.

In this embodiment, the first object distribution information corresponding to the first region may be determined according to the first object set, where the first object distribution information is used to indicate distribution of objects under respective object categories in the first region.

The object categories described here are the function categories mentioned above. In a possible implementation of determining the first object distribution information, it is possible to divide the first object set into at least one first sub-object set according to the object categories of objects in the first object set, where objects in each first sub-object set have the same object category.

Hereafter, taking the object being the point of interest as an example to introduce the specific implementation. Specifically, the first object set corresponding to the first region includes a plurality of points of interest, and the first object set may be divided to obtain at least one first sub-object set according to a respective object category (function category) corresponding to a respective point of interest, where the object categories of the objects in a respective first sub-object set are the same.

For instance, if the first object set of the first region currently includes a school 1, a school 2, a school 3, a store 1 and a store 2, and for example, the first object set may be divided into two first sub-object sets, which are a set Q{the school 1, the school 2, the school 3} and a set P{the store 1, the store 2}, it is observed that the object category of the objects in the set Q is school, and the object category of the objects in the set P is store.

After that, determining a first frequency of the object category corresponding to each first sub-object set according to a quantity of objects in each first sub-object set.

Specifically, after dividing the first sub-object set, it is possible to determine the frequency of occurrence of a respective object category corresponding to a respective first sub-object set, for instance, following the above-described example, the first sub-object set Q and the first sub-object set P are currently determined, the quantity of objects included in the first sub-object set Q is 3, then it may be determined that the first frequency of the object category "school" corresponding to the first sub-object set Q is 3. Similarly, the quantity of objects included in the first sub-object set P is 2, and it may be determined that the first frequency of the object category "store" corresponding to the first sub-object set P is 2.

Understandably, the first frequency determined here actually corresponds to the frequency $z_i$ at which the function category i appears in the region r, as described in the above formula 6.

In an actual implementation process, the specific implementation of the first frequency may be determined according to actual needs, which is not limited in this embodiment.

After that, the first object distribution information is determined according to the first frequency of the object category corresponding to each first sub-object set.

After determining the first frequency of the object category corresponding to each first sub-object set, for example, after obtaining the frequency $z_i$ described in the above formula 6, then for example, it is possible to substitute the first frequency of the object category corresponding to each first sub-object set $z_i$ into the above formula 6, so as to determine the first object distribution information δ(a).

S308. Determine second object distribution information corresponding to the second region according to the second object set, where the second object distribution information is used to indicate distribution of objects under respective object categories in the second region.

The implementation of determining the second object distribution information δ(b) corresponding to the second region in S308 is similar to that described above, and the second object distribution information may also be determined according to the following implementation:

dividing the second object set into at least one second sub-object set according to object categories of objects in the second object set, where objects in each second sub-object set have the same object category;

determining a second frequency of an object category corresponding to each second sub-object set according to a quantity of the objects in each second sub-object set; and determining the second object distribution information according to the second frequency of the object category corresponding to each second sub-object set.

For detailed implementation, reference may be made to the implementation of determining the first object distribution information described in the above S307, which is not described in detail here.

S309. Determine the total object distribution information according to the first object distribution information and the second object distribution information.

After obtaining the first object distribution information corresponding to the first region and the second object distribution information corresponding to the second region, it is possible to determine the total object distribution information according to the first object distribution information and the second object distribution information.

In a possible implementation, for example, the first object distribution information δ(a) and the second object distribution information δ(b) may be processed according to the above-described formula 5, so as to obtain the total object distribution information η(a, b).

Understandably, 0.5 in the above formula 5 is also a weight value. In the actual implementation process, the weight value before the first object distribution information and the weight value before the second object distribution information may be selected according to actual needs, which is not specifically limited in this embodiment.

Understandably, the total object distribution information determined in this embodiment actually indicates the correlation between the first region and the second region in terms of function diversity.

S310. Determine spatial dependency information according to the total normalized area, the total object distribution information and the first distance.

After execution of the above steps is completed, the total normalized area ρ(a, b) of the first region and the second region, and the total object distribution information η(a, b) of the first region and the second region are obtained, after that, the spatial dependency information may be determined according to the total normalized area, the total object distribution information and the first distance.

In a possible implementation, for example, the power law attenuation degree α(a, b) may be determined firstly according to the formula 2 described above.

Secondly, according to the above-described formula 1, the spatial dependency information ζ(a, b) of the first region and the second region is determined according to the power law attenuation degree α(a, b) and the distance d(a, b).

Thus, the introduction of the spatial dependency information ζ(a, b) between the first region and the second region in the embodiments of the present disclosure is completed.

Based on the above introduction, it is worth noting here that the power law attenuation degree α(a, b) determined in this embodiment is actually a description of the attenuation degree of the distance from the perspective of the area of the region as well as the perspective of the function distribution diversity of the region, that is, if at least one of the two regions is large, or functional facilities thereof are perfect, then the distance attenuation between the two regions will be slower, otherwise the attenuation will be faster.

S311. Determine at least one first object category existing in the first object set and a first category quantity of the at least one first object category.

After introducing the implementation of the spatial dependency information ζ(a, b) above, the implementation of the object dependency information will be described below in conjunction with S311-S314.

In a possible implementation, the implementation of the object dependency information may satisfy, for example, the following formula 7:

$$\mu(a, b) = \frac{\sum_i^{|\Gamma_a|}\sum_j^{|\Gamma_b|}\kappa_{i\to j}\psi(i, j) + \sum_i^{|\Gamma_a|}\sum_j^{|\Gamma_b|}\kappa_{j\to i}\psi(j, i)}{2 \cdot |\Gamma_a| \cdot |\Gamma_b|} \quad \text{Formula 7}$$

Among them, $|\Gamma_a|$ represents the quantity of function categories included in the region a, $|\Gamma_b|$ represents the quantity of function categories included in the region b, $\kappa_{i\to j}$ represents attraction of a function category i to a function category j, $\kappa_{j\to i}$ represents attraction of the function category j to the function category i, $\psi(i,j)$ represents the dependency relationship of function category i to function category j, and $\psi(j,i)$ represents a dependency relationship of the function category j to the function category i, $\mu(a, b)$ is the object dependency information between the region a and the region b.

Therefore, in this embodiment, in order to determine the object dependency information $\mu(a, b)$, it is necessary to determine the quantity of object categories included in the first region, and the quantity of object categories included in the second region, and the object relationship between the first object category and the second object category (including the above-described attraction and dependency relationship).

Therefore, in this embodiment, at least one first object category existing in the first object set and the first category quantity of the at least one first object category may be determined.

For example, the object categories of the objects in the first object set may be determined respectively, so as to determine the at least one first object category, and then determine the first category quantity of the at least one first object category, where the first category quantity may correspond to $|\Gamma_a|$ in the above formula 7.

S312. Determine at least one second object category existing in the second object set and a second category quantity of the at least one second object category.

In this embodiment, the at least one second object category existing in the second object set and the second category quantity of the at least one second object category may be determined.

For example, the object categories of the objects in the second object set may be determined respectively, so as to determine the at least one second object category, and then determine the second category quantity of the at least one second object category, where the second category quantity may correspond to $|\Gamma_b|$ in the above formula 7.

S313. Determine an object relationship between the at least one first object category and the at least one second object category in a total region, where the total region includes the first region and the second region.

In this embodiment, the first region and the second region belong to a total region. The total region mentioned here may be, for example, the city region described in the above embodiments, that is, the first region and the second region belong to the same city region.

After that, the object relationship between the at least one first object category and the at least one second object category in the total region may be determined. The object relationship in this embodiment may include the following content:

first attraction of each first object category to each second object category, which may be understood as $\kappa_{i\to j}$ in the above formula 7;

second attraction of each second object category to each first object category, which may be understood as $\kappa_{j\to i}$ in the above formula 7;

a first dependency relationship of each first object category to each second object category, which may be understood as $\psi(i,j)$ in the above formula 7;

a second dependency relationship of each second object category to each first object category, which may be understood as $\psi(j,i)$ in the above formula 7.

In a possible implementation, the attraction between the function categories included and the dependency relationship between the function categories in the object relationship actually have nothing to do with the division of the regions, but simply depend on specific types of the function categories. Therefore, for example, the above-described corresponding relationship may be determined in advance, the relevant object relationship may thus be acquired directly when determining the object dependency relationship between the first region and the second region.

In a possible implementation, the corresponding relationship in this embodiment may be, for example, a matrix implementation. For example, the object relationship in this embodiment may be understood with reference to FIG. 5.

As shown in FIG. 5, assuming that the total quantity of current function categories is L, for example, for these L function categories, a matrix indicating the corresponding relationship may be established in advance, and the matrix includes the attraction and dependency relationship of the function categories between each other.

For instance, in the matrix shown in FIG. 5, a matrix element corresponding to $(\gamma_1, \gamma_2)$ may include attraction between a function category 1 and a function category 2, as well as a dependency relationship between the function category 1 and the function category 2, the implementation of the other function categories is similar. In addition to the matrix implementation described here, the object relationship may also be implemented in other ways, as long as the object relationships include the attraction and dependency relationships between the categories, the specific implementation may be selected and expanded according to actual needs.

S314. Determine the object dependency information according to the first category quantity, the second category quantity, and the object relationship.

After determining the first category quantity, the second category quantity, and the object relationship based on the above-described content, for example, it is possible to determine the object dependency relationship μ(a, b) in conjunction with the above-described formula 7.

S315. Determine the symbiosis between the first region and the second region according to the spatial dependency information and the object dependency information.

After obtaining the spatial dependency information and the object dependency information, it is possible to determine the symbiosis between the first region and the second region according to the spatial dependency information and the object dependency information. In a possible implementation, the symbiosis may satisfy, for example, the following formula 8:

$$s(a, b) = \frac{2}{\pi} \times \arctan(\omega_0 \times \zeta(a, b) \times \mu(a, b)) \quad \text{Formula 8}$$

Among them, arctan(•) is an arctangent function, $$\frac{2}{\pi}\arctan(\cdot)$$

is a normalized calculation method, $\omega_0$ is a constant, for example, the default value thereof is 500, and ζ(a, b) is the spatial dependency information between the region a and the region b, μ(a, b) is the object dependency information between the region a and the region b, and s(a, b) is the symbiosis between the region a and the region b, which may specifically be a symbiotic level.

It is worth noting that the above introduces a plurality of possible formulas involved in the process of determining the symbiosis. In the actual implementation process, instead of limiting to the various above-described formulas, the symbiosis in this embodiment may be obtained through the identical transformations of the above formulas, or by adding corresponding parameters on the basis of the above formulas, or by making certain adjustments to the parameters therein, which is not limited in this embodiment.

In this embodiment, after obtaining the symbiosis, it is possible to perform certain processing operations on the first region and the second region according to the symbiosis, and the operations may include, for example:

updating maps of the first region and the second region, this operation may be understood as, for example, enriching the content of the maps; and, updating traffic scheduling information corresponding to the first region and the second region, this operation may be understood as, for example, optimizing traffic scheduling; and, determining a target location corresponding to a target object in the first region and the second region, where the target object is an object to be added in the first region and/or the second region, this operation may be understood as, for example, recommendation of site selection for an object, etc.

Moreover, in the actual implementation process, in addition to implement the operations described above according to the symbiosis, operations such as comprehensive urban governance may also be performed, which is not limited in this embodiment, and may be selected according to actual needs.

Further, after obtaining the symbiosis between the first region and the second region, for example, in a specific scenario, it is possible to display the symbiosis between the first region and the second region on a display device; or, it is possible to send the symbiosis between the first region and the second region to a target device; or, it is possible to perform the above operations on the first region and the second region according to the symbiosis. The specific implementation after obtaining the symbiosis is not limited in this embodiment, which may be selected according to actual needs.

In the region information processing method provided by the embodiments of the present disclosure, a symbiosis between a first region and a second region is determined through the above-described steps, specifically, multi-dimensional information such as the distance, the comparison of areas, and the comparison of functional distributions between the first region and the second region are taken into account, thereby determining the symbiosis between the first region and the second region, specifically, the symbiotic level between regions is positively correlated with the distance, the closer the distance, the higher the symbiotic level, however, the attenuation of the symbiotic level should not be linear. As the distance increases, the attenuation of the symbiotic level should become slower and slower. Secondly, there is also a certain correlation between the strength of the symbiosis between regions and whether there exists a complementary relationship between regions, therefore, the symbiosis between the first region and the second region may be determined accurately and effectively according to the spatial dependency information and the object dependency information.

On the basis of the above-described embodiments, the implementation of the attraction and dependency relationship in the above-described object relationship will be described below.

Figure 6:
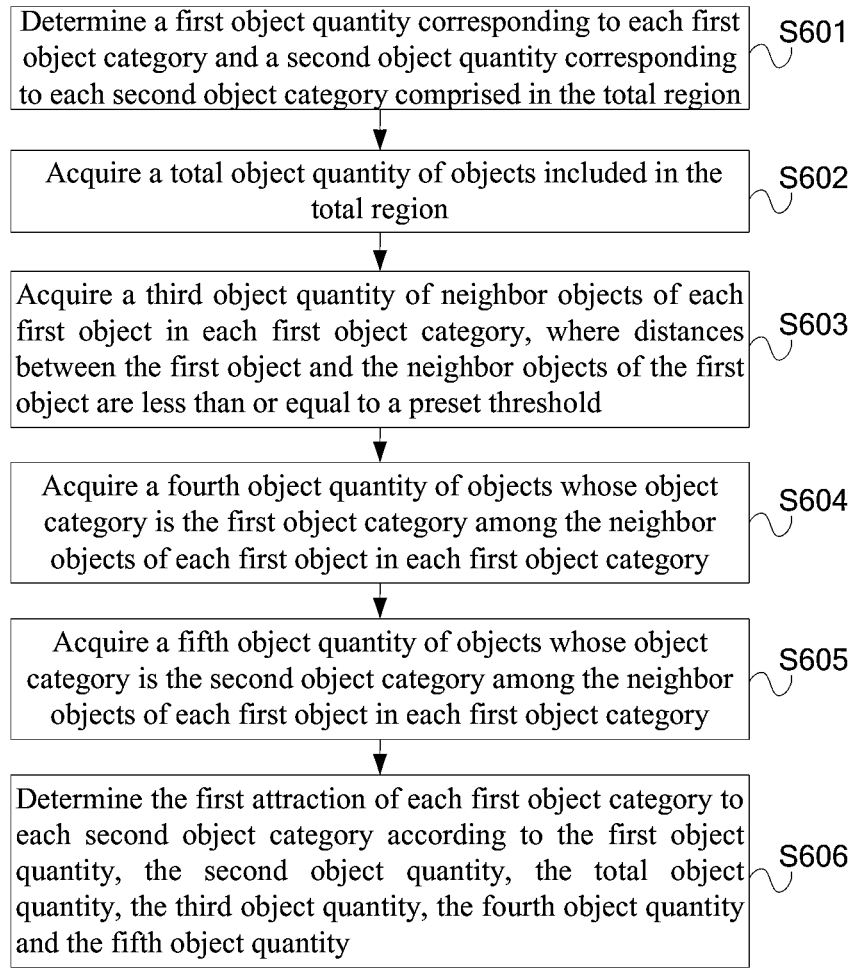
FIG. 6 is a third flowchart of a region information processing method provided by an embodiment of the present disclosure.

First, an implementation of determining the attraction between function categories is described with reference to FIG. 6. FIG. 6 is a third flowchart of a region information processing method provided by an embodiment of the present disclosure.

As shown in FIG. 6, the method includes:

S601. Determine a first object quantity corresponding to each first object category and a second object quantity corresponding to each second object category included in the total region.

In a possible implementation, the determination of the attraction between function categories may satisfy, for example, the following formula 9:

$$\kappa_{i \to j} = \frac{N - N_i}{N_i \cdot N_j} \sum_{q:\gamma(q)=i} \frac{N_j(q)}{N(q) - N_i(q)} \quad \text{Formula 9}$$

Among them, $\kappa_{i \to j}$ represents the attraction of a function category i to a function category j. Among them, N represents the quantity of all POIs in the city currently, and $N_i$, $N_j$ respectively represent the quantity of POIs of the category i and the quantity of POIs of the category j currently in the city. γ(q)=i represents that the function category of POI q is i, N(q) represents the total quantity of neighbor POIs of q, $N_i(q)$ represents the quantity of neighbor POIs of q under the category i, and $N_j(q)$ represents the quantity of neighbor POIs of q under the category j.

Therefore, in this embodiment, the attraction between function categories may be obtained by acquiring various data in the above formula 9.

In this embodiment, it is possible to determine the first object quantity corresponding to each first object category included in the total region, for example, corresponding to $N_i$ in the above formula 9.

Besides, it is possible to determine the second object quantity corresponding to each second object category included in the total region, for example, corresponding to $N_j$ in the above formula 9, and the total region described here may be understood as, for example, the above-described city.

S602. Acquire a total object quantity of objects included in the total region.

In this embodiment, it is possible to determine the total object quantity of objects included in the total region, for example, corresponding to N in the above formula 9.

S603. Acquire a third object quantity of neighbor objects of each first object in each first object category, where distances between the first object and the neighbor objects of the first object are less than or equal to a preset threshold.

In this embodiment, it is possible to acquire the third object quantity of the neighbor objects of each first object in each first object category, for example, corresponding to N(q) in the above formula 9.

In this embodiment, a neighbor object of the first object refers to an object whose distance from the first object is less than or equal to a preset threshold.

S604. Acquire a fourth object quantity of objects whose object category is the first object category among the neighbor objects of each first object in each first object category.

In this embodiment, it is possible to obtain the fourth object quantity of objects whose object category is the first object category among the neighbor objects of each first object in each first object category, for example, corresponding to $N_i(q)$ in the above formula 9.

S605. Acquire a fifth object quantity of objects whose object category is the second object category among the neighbor objects of each first object in each first object category.

In this embodiment, it is possible to obtain the fifth object quantity of objects whose object category is the second object category among the neighbor objects of each first object in each first object category, for example, corresponding to $N_j(q)$ in the above formula 9.

Understandably, the acquired various quantities described in the current embodiment may be acquired from map data, or may also be acquired from a preset device, which is not limited in this embodiment.

S606: Determine the first attraction of each first object category to each second object category according to the first object quantity, the second object quantity, the total object quantity, the third object quantity, the fourth object quantity and the fifth object quantity.

After obtaining the above-described data, for example, in conjunction with the above-described formula 9, the first attraction $\kappa_{i \to j}$ of each first object category to each second object category may be determined according to the first object quantity $N_i$, the second object quantity $N_j$, the total object quantity N, the third object quantity N(q), the fourth object quantity $N_i(q)$ and the fifth object quantity $N_j(q)$.

In this embodiment, an implementation of determining the first attraction of each first object category to each second object category is described, an implementation of determining the second attraction of each second object category to each first object category is similar, which is not described in detail here.

Therefore, according to the region information processing method provided by the embodiments of the present disclosure, the attraction between function categories may be determined accurately and effectively based on the above-described process.

Figure 7:
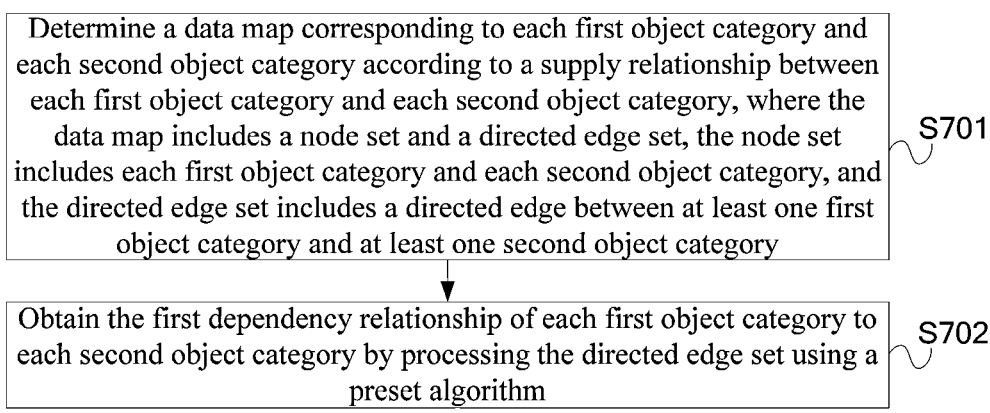
FIG. 7 is a fourth flowchart of a region information processing method provided by an embodiment of the present disclosure.

An implementation of determining the dependency relationship between function categories is described below with reference to FIG. 7. FIG. 7 is a fourth flowchart of a region information processing method provided by an embodiment of the present disclosure.

As shown in FIG. 7, the method includes:

S701. Determine a data map corresponding to each first object category and each second object category according to a supply relationship between each first object category and each second object category, where the data map includes a node set and a directed edge set, the node set includes each first object category and each second object category, and the directed edge set includes a directed edge between at least one first object category and at least one second object category.

In this embodiment, the supply relationship between each first object category and each second object category may indicate, for example, an upstream and downstream relationship between various object categories in the sense of the industrial chain. Here, an example is taken for illustrating the supply relationship, for instance, there is currently an object category of "store", and there is another object category of "building material market". Some containers, furniture or the like are required for normal running of the "store", so there is a supply relationship between the object category of "building material market" and the object category of "store", and the "building materials market" may be understood as the upstream of the "store".

Therefore, in this embodiment, the data maps corresponding to each first objection category and each second object category may be obtained by analyzing whether there exists the upstream and downstream relationship (that is, the supply relationship in this embodiment) in the sense of the industrial chain between function categories of different POIs, the data map here may also be understood as a supply relationship graph, which may be expressed as $\mathcal{G} = \{\mathcal{V}, \mathcal{E}\}$. Understandably, the data map here refers to a "graph" as a data structure.

In the data map, a node set $\mathcal{V}$ is included, and function categories are included in the node set $\mathcal{V}$, that is, each first object category and each second object category are included; $\mathcal{E}$ represents a directed edge set, and the directed edge set includes a directed edge between at least one first object category and at least one second object category, for instance, there is a directed edge between a function category i and a function category j, expressed as: $i \to j \in \mathcal{E}$, then from a perspective of industrial supply chain, identifying the function category i to be the upstream of the function category j.

S702. Obtain the first dependency relationship of each first object category to each second object category by processing the directed edge set using a preset algorithm.

After obtaining the directed edge set in the above-described data map, it is possible to process the directed edge set through a preset algorithm.

Where the preset algorithm may be, for example, a PageRank (PageRank) algorithm, the accessibility from the function category i to the function category j may be obtained by the PageRank algorithm, that is, the dependency relationship described in this embodiment. Understandably, the dependency relationship described in this embodiment may indicate the closeness of the dependency between the object categories.

Where the implementation of processing using the preset algorithm may satisfy, for example, the following formula 10:

$$\psi(i, j) = \frac{\text{PageRank}(i,j)}{\sum_{j \in \varepsilon(g)}} \quad \text{Formula 10}$$

Among them, PageRank ( ) represents the PageRank algorithm, $i \rightarrow j \in \varepsilon(\mathcal{G})$ represents the directed edge between the function category i and the function category j, and $\psi(i,j)$ is the dependency relationship of the function category i to the function category j.

In this embodiment, an implementation of determining the first dependency relationship of each first object category to each second object category is described, an implementation of determining the second dependency relationship of each second object category to each first object category is similar, which is not described in detail here.

Therefore, according to the region information processing method provided by the embodiments of the present disclosure, the dependency relationship between function categories may be determined accurately and effectively based on the above-described process.

Figure 8:
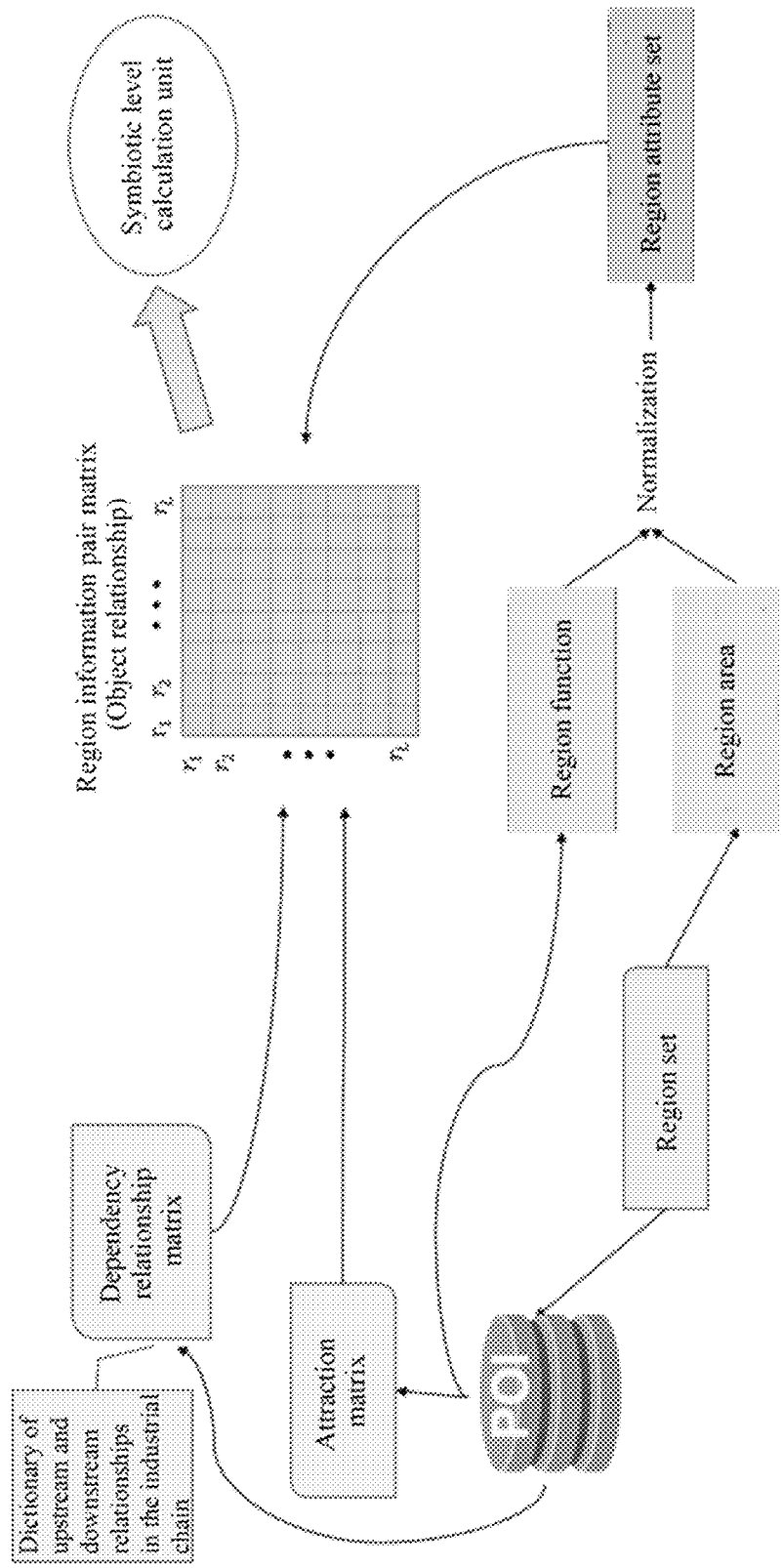
FIG. 8 is a schematic flowchart of a region information processing method provided by an embodiment of the present disclosure.

On the basis of the above-described embodiments, an implementation of the region information processing method provided by the present disclosure will be further systematically illustrated below with reference to FIG. 8. FIG. 8 is a schematic flowchart of a region information processing method provided by the embodiments of the present disclosure.

As shown in FIG. 8, for example, POI data, a region set in a city, and a dictionary of upstream and downstream relationships in the industrial chain may be obtained, the POI data includes data of each POI currently in the city, and the region set includes pre-divided smaller regions of the city, for instance, communities, parks, blocks, etc.

After that, based on the region set, the POI data may be allocated to their corresponding regions according to their geographic location information, so that respective POIs corresponding to respective regions (that is, the object sets described in the above embodiment) are obtained.

Alternatively, in addition to the allocation method currently described, the respective POIs included in respective regions within the range of respective regions may be directly acquired, so that the respective object sets corresponding to the respective regions are obtained. This implementation is also possible, which is not limited in this embodiment.

After that, according to the POI set contained in each region, the κ (Kappa) value between different object categories at the city granularity may be obtained to obtain the Kappa matrix of the city at the moment. The Kappa matrix here is the attraction matrix shown in FIG. 8, the attraction ($\kappa_{i \rightarrow j}$) between respective object categories is included in the Kappa matrix.

The POI data and the dictionary of upstream and downstream relationships of the industrial chain may be used as an input of the preset algorithm to calculate the closeness of the supply relationship between different object categories, thereby obtaining the city function PageRank matrix. The PageRank matrix here is the dependency relationship matrix shown in FIG. 8, the dependency relationships ($\psi(i,j)$) between respective object categories are included in the PageRank matrix.

After that, the attraction matrix (Kappa matrix) and the dependency relationship matrix (PageRank matrix) may be combined to obtain the region information pair matrix shown in FIG. 8, which corresponds to the object relationship described in the above embodiment. For each element in the region information pair matrix, the attraction and dependency relationship between two function categories are included.

It is worth nothing that, in this embodiment, since the region information pair matrix is determined in advance, the region information pair matrix includes the attraction and dependency relationship between any two function categories, therefore, when determining the symbiosis between any two regions subsequently, the corresponding relationship information may be directly acquired from the matrix without real-time calculation, thereby effectively saving the calculation workload and improving the efficiency and speed of determining the symbiosis.

Referring to FIG. 8, in this embodiment, the region function and region area of each region may be normalized according to the region set and the POI data included in each region set to obtain a region attribute set, the region attribute set actually corresponds to the total normalized area and the total object distribution information described in the above embodiment.

Then, according to the above-described region information pair matrix and the region attribute set may be input into a symbiotic level calculating unit for parallel processing, so as to obtain a symbiotic level index between any two regions in the city, which is the symbiosis described in the above embodiment.

In summary, in the region information processing method provided by the embodiments of the present disclosure, the quantification of the symbiosis between different regions is realized accurately and effectively by taking the distance relationship and functional complementarity into account.

Figure 9:
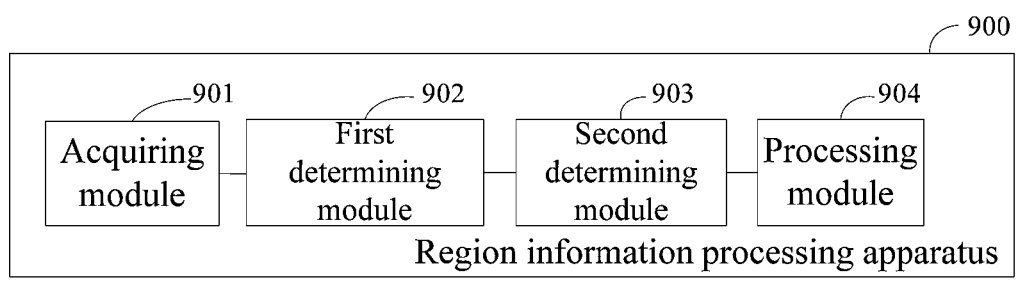
FIG. 9 is a schematic structural diagram of a region information processing apparatus provided by an embodiment of the present disclosure.

FIG. 9 is a schematic structural diagram of a region information processing apparatus according to an embodiment of the disclosure. As shown in FIG. 9, the region information processing apparatus 900 of this embodiment may include: an acquiring module 901, a first determining module 902, a second determining module 903, and a processing module 904.

The acquiring module 901 is configured to acquire a first distance between a first region and a second region, a first object set included in the first region, and a second object set included in the second region.

The first determining module 902 is configured to determine spatial dependency information between the first region and the second region according to the first distance.

The second determining module 903 is configured to determine object dependency information between the first region and the second region according to the first object set and the second object set;

The processing module 904, configured to determine a symbiosis between the first region and the second region according to the spatial dependency information and the object dependency information In a possible implementation, the first determining module 902 is specifically configured to:

determine that the spatial dependency information is preset information, if the first distance is less than or equal to a preset distance; and acquire a first area of the first region and a second area of the second region, and determine the spatial dependency information between the first region and the second region according to the first area, the second area, the first object set, the second object set and the first distance, if the first distance is greater than the preset distance.

In a possible implementation, the first determining module 902 is specifically configured to:

determine a total normalized area of the first region and the second region according to the first area and the second area;

determine total object distribution information in the first region and the second region according to the first object set and the second object set; and determine the spatial dependency information according to the total normalized area, the total object distribution information and the first distance.

In a possible implementation, the first determining module 902 is specifically configured to:

determine a first normalized area corresponding to the first area and a second normalized area corresponding to the second area; and determine the total normalized area according to a first weight value corresponding to the first region, a second weight value corresponding to the second region, the first normalized area and the second normalized area.

In a possible implementation, the first determining module 902 is specifically configured to:

determine first object distribution information corresponding to the first region according to the first object set, where the first object distribution information is used to indicate distribution of objects under respective object categories in the first region;

determine second object distribution information corresponding to the second region according to the second object set, where the second object distribution information is used to indicate distribution of objects under respective object categories in the second region; and determine the total object distribution information according to the first object distribution information and the second object distribution information.

In a possible implementation, the first determining module 902 is specifically configured to:

divide the first object set into at least one first sub-object set according to object categories of objects in the first object set, where objects in each first sub-object set have a same object category;

determine a first frequency of an object category corresponding to each first sub-object set according to a quantity of the objects in each first sub-object set; and determine the first object distribution information according to the first frequency of the object category corresponding to each first sub-object set.

In a possible implementation, the first determining module 902 is specifically configured to:

divide the second object set into at least one second sub-object set according to object categories of objects in the second object set, where objects in each second sub-object set have a same object category;

determine a second frequency of an object category corresponding to each second sub-object set according to a quantity of the objects in each second sub-object set; and determine the second object distribution information according to the second frequency of the object category corresponding to each second sub-object set.

In a possible implementation, the second determining module 903 is specifically configured to:

determine at least one first object category existing in the first object set and a first category quantity of the at least one first object category;

determine at least one second object category existing in the second object set and a second category quantity of the at least one second object category;

determine an object relationship between the at least one first object category and the at least one second object category in a total region, where the total region includes the first region and the second region; and determine the object dependency information according to the first category quantity, the second category quantity and the object relationship.

In a possible implementation, the object relationship includes:

first attraction of each first object category to each second object category;

second attraction of each second object category to each first object category;

a first dependency relationship of each first object category to each second object category;

a second dependency relationship of each second object category to each first object category.

In a possible implementation, the second determining module 903 is further configured to:

determine a first object quantity corresponding to each first object category and a second object quantity corresponding to each second object category included in the total region;

acquire a total object quantity of objects included in the total region;

acquire a third object quantity of neighbor objects of each first object in each first object category, where distances between the first object and the neighbor objects of the first object are less than or equal to a preset threshold;

acquire a fourth object quantity of objects whose object category is the first object category among the neighbor objects of each first object in each first object category;

acquire a fifth object quantity of objects whose object category is the second object category among the neighbor objects of each first object in each first object category; and determine the first attraction of each first object category to each second object category according to the first object quantity, the second object quantity, the total object quantity, the third object quantity, the fourth object quantity and the fifth object quantity.

In a possible implementation, the second determining module 903 is further configured to:

determine a data map corresponding to each first object category and each second object category according to a supply relationship between each first object category and each second object category, where the data map includes a node set and a directed edge set, the node set includes each first object category and each second object category, and the directed edge set includes a directed edge between the at least one first object category and the at least one second object category; and obtain the first dependency relationship of each first object category to each second object category by processing the directed edge set using a preset algorithm.

In a possible implementation, the processing module 904 is further configured to:

perform at least one of the following operations on the first region and the second region according to the symbiosis:

updating maps of the first region and the second region;

updating traffic scheduling information corresponding to the first region and the second region;

determining a target location corresponding to a target object in the first region and the second region, where the target object is an object to be added in the first region and/or the second region.

The present disclosure provides a region information processing method and apparatus, which are applied to the field of artificial intelligence in computer technology, so as to realize accurate and effective quantification of the interdependent relationship between different regions.

According to an embodiment of the present disclosure, the present disclosure also provides an electronic device and a readable storage medium.

According to an embodiment of the present disclosure, the present disclosure also provides a computer program product. The computer program product includes a computer program, the computer program is stored in a readable storage medium, and at least one processor of an electronic device may read the computer program from the readable storage medium, and at least one processor executes the computer program to make the electronic device execute the solution provided in any of the above embodiments.

Figure 10:
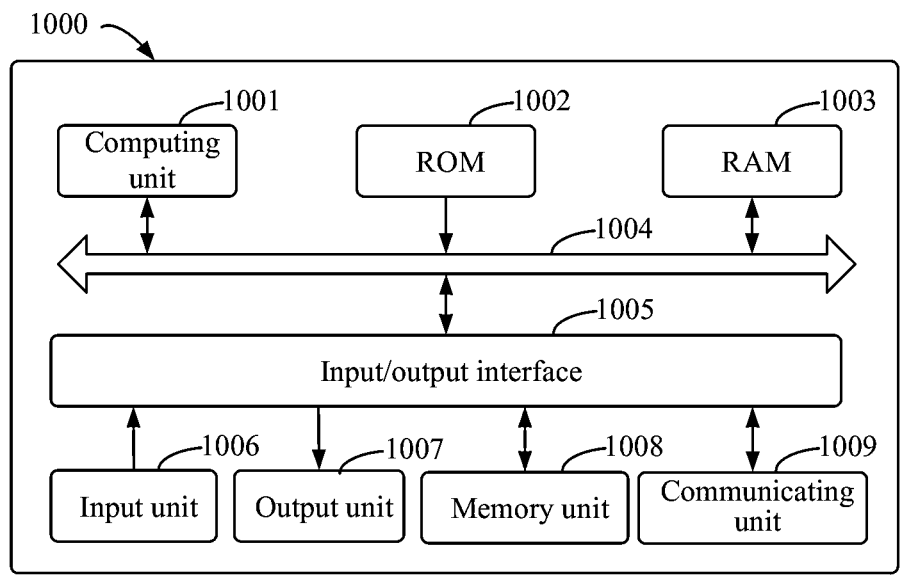
FIG. 10 is a block diagram of an electronic device for implementing a region information processing method of an embodiment of the present disclosure.

FIG. 10 illustrates a schematic block diagram of an example electronic device 1000 that may be used to implement embodiments of the present disclosure. The electronic device is intended to represent various forms of digital computer, such as a laptop computer, a desktop computer, a workstation, a personal digital assistant, a server, a blade server, a mainframe computer, and other suitable computers. The electronic device may also represent various forms of mobile apparatus, such as a personal digital assistant, a cellular phone, a smart phone, a wearable device, and other similar computing apparatus. The components shown herein, their connections and relationships, and their functions are merely exemplary, and are not intended to limit the implementation of the present disclosure described and/or required herein.

As shown in FIG. 10, the electronic device 1000 includes a computing unit 1001, which may perform various suitable actions and processing according to a computer program stored in a read-only memory (ROM) 1002 or a computer program loaded from a memory unit 1008 into a random access memory (RAM) 1003. In the RAM 1003, various programs and data required for operations of the device 1000 may also be stored. The computing unit 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, such as a keyboard, a mouse, etc.; an output unit 1007, such as various types of displays, speakers, etc.; a memory unit 1008, such as a magnetic disk, an optical disk, etc.; and a communicating unit 1009, such as a network card, a modem, a wireless communication transceiver, etc. The communicating unit 1009 allows the device 1000 to exchange information/data with other devices via a computer network such as the Internet and/or various telecommunication networks.

The computing unit 1001 may be various general-purpose and/or special-purpose processing components with processing and computing capabilities. Some examples of the computing unit 1001 include, but are not limited to, a central processing unit (CPU), a graphics processing unit (GPU), various special-purpose artificial intelligence (AI) computing chips, various computing units that run machine learning model algorithms, and a digital signal processor (DSP), and any suitable processor, controller, microcontroller, etc. The computing unit 1001 executes the various methods and processes described above, such as the region information processing method. For example, in some embodiments, the region information processing method may be implemented as a computer software program, which is tangibly contained in a machine-readable medium, such as the memory unit 1008. In some embodiments, part or all of the computer program may be loaded and/or installed on the device 1000 via the ROM 1002 and/or the communicating unit 1009. When the computer program is loaded into the RAM 1003 and executed by the computing unit 1001, one or more steps of the region information processing method described above may be executed. Alternatively, in other embodiments, the computing unit 1001 may be configured to execute the region information processing method in any other suitable manners (for example, by means of firmware).

Various implementations of the systems and techniques described above herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software, and/or their combination. These various embodiments may include: being implemented in one or more computer programs, the one or more computer programs may be executed and/or interpreted on a programmable system including at least one programmable processor, the programmable processor may be a special-purpose or general-purpose programmable processor that may receive data and instructions from a storage system, at least one input apparatus, and at least one output apparatus, and transmit data and instructions to the storage system, the at least one input apparatus, and the at least one output apparatus.

The program codes used to implement the method of the present disclosure may be written in any combination of one or more programming languages. These program codes may be provided to a processor or a controller of a general-purpose computer, a special-purpose computer, or other programmable data processing apparatus, so that when the program codes are executed by the processor or controller, the functions/the operations specified in the flowcharts and/or block diagrams are implemented. The program codes may be executed entirely on a machine, partly executed on the machine, partly executed on the machine and partly executed on a remote machine as an independent software package, or entirely executed on the remote machine or server.

In the context of the present disclosure, a machine-readable medium may be a tangible medium, which may contain or store a program for use by an instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium will include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above content.

In order to provide interaction with a user, the systems and techniques described herein may be implemented on a computer with: a display apparatus (for example, a cathode ray tube (CRT) or liquid crystal display (LCD) monitor) for displaying information to the user; and a keyboard and pointing apparatus (for example, a mouse or a trackball), with which the user may provide inputs to the computer. Other kinds of apparatuses may also be used to provide interaction with users; for example, feedback provided to the user may be any form of sensory feedback (e.g., visual feedback, auditory feedback, or tactile feedback); and the inputs from the user may be received in any form (including sound inputs, voice inputs, or tactile inputs).

The systems and techniques described herein may be implemented in a computing system (e.g., as a data server) that includes back-end components, a computing system (e.g., an application server) that includes middleware components, a computing system (e.g., a user computer with a graphical user interface or a web browser, through which the user may interact with the implementation of the systems and techniques described herein) that includes front-end components, or a computing system that includes any combination of such back-end components, middleware components or front-end components. The components of the system may be interconnected by digital data communication (e.g., a communication network) of any form or medium. The examples of the communication network include: a local region network (LAN), a wide region network (WAN) and the Internet.

The computer system may include a client and a server. The client and the server are generally far from each other and usually interact through a communication network. The client-server relationship is generated by computer programs that run on corresponding computers and have a client-server relationship. The server may be a cloud server, also known as a cloud computing server or a cloud host, which is a host product in a cloud computing service system to solve shortcomings of difficult management and weak business scalability existed in traditional physical hosts and VPS services ("Virtual Private Server", or "VPS" for short). The server may also be a server of a distributed system, or a server combined with a blockchain.

It should be understood that for the various forms of processes shown above, steps may be reordered, added or deleted. For example, the steps described in the present application may be performed in parallel, sequentially, or in different orders, as long as the desired results of the technical solutions disclosed in the present disclosure can be achieved, which is not limited herein.

The above specific implementations do not constitute a limitation on the scope of protection of the present disclosure. Those skilled in the art should understand that various modifications, combinations, sub-combinations and substitutions may be made according to design requirements and other factors. Any modification, equivalent replacement and improvement made within the spirit and principle of the present disclosure shall fall within the scope of protection of the present disclosure.

What is claimed is:

1. A region information processing method, comprising:
   acquiring a first distance between a first region and a second region, a first object set comprised in the first region, and a second object set comprised in the second region;
   determining spatial dependency information between the first region and the second region according to the first distance;
   determining object dependency information between the first region and the second region according to the first object set and the second object set; and
   determining a symbiosis between the first region and the second region according to the spatial dependency information and the object dependency information;
   wherein the determining the spatial dependency information between the first region and the second region according to the first distance comprises:
   if the first distance is less than or equal to a preset distance, determining that the spatial dependency information is preset information; and
   if the first distance is greater than the preset distance, acquiring a first area of the first region and a second area of the second region, and determining the spatial dependency information between the first region and the second region according to the first area, the second area, the first object set, the second object set and the first distance.

2. The method according to claim 1, wherein the determining the spatial dependency information between the first region and the second region according to the first area, the second area, the first object set, the second object set and the first distance comprises:
   determining a total normalized area of the first region and the second region according to the first area and the second area;
   determining total object distribution information in the first region and the second region according to the first object set and the second object set; and
   determining the spatial dependency information according to the total normalized area, the total object distribution information and the first distance.

3. The method according to claim 2, wherein the determining the total normalized area of the first region and the second region according to the first area and the second area comprises:
   determining a first normalized area corresponding to the first area and a second normalized area corresponding to the second area; and
   determining the total normalized area according to a first weight value corresponding to the first region, a second weight value corresponding to the second region, the first normalized area and the second normalized area.

4. The method according to claim 3, wherein the determining the total object distribution information in the first region and the second region according to the first object set and the second object set comprises:
   determining first object distribution information corresponding to the first region according to the first object set, wherein the first object distribution information is used to indicate distribution of objects under respective object categories in the first region;
   determining second object distribution information corresponding to the second region according to the second object set, wherein the second object distribution information is used to indicate distribution of objects under respective object categories in the second region; and determining the total object distribution information according to the first object distribution information and the second object distribution information.

5. The method according to claim 4, wherein the determining the object dependency information between the first region and the second region according to the first object set and the second object set comprises:

determining at least one first object category existing in the first object set and a first category quantity of the at least one first object category;

determining at least one second object category existing in the second object set and a second category quantity of the at least one second object category;

determining an object relationship between the at least one first object category and the at least one second object category in a total region, wherein the total region comprises the first region and the second region; and determining the object dependency information according to the first category quantity, the second category quantity and the object relationship.

6. The method according to claim 3, wherein the determining the object dependency information between the first region and the second region according to the first object set and the second object set comprises:

determining at least one first object category existing in the first object set and a first category quantity of the at least one first object category;

determining at least one second object category existing in the second object set and a second category quantity of the at least one second object category;

determining an object relationship between the at least one first object category and the at least one second object category in a total region, wherein the total region comprises the first region and the second region; and determining the object dependency information according to the first category quantity, the second category quantity and the object relationship.

7. The method according to claim 2, wherein the determining the total object distribution information in the first region and the second region according to the first object set and the second object set comprises:

determining first object distribution information corresponding to the first region according to the first object set, wherein the first object distribution information is used to indicate distribution of objects under respective object categories in the first region;

determining second object distribution information corresponding to the second region according to the second object set, wherein the second object distribution information is used to indicate distribution of objects under respective object categories in the second region; and determining the total object distribution information according to the first object distribution information and the second object distribution information.

8. The method according to claim 7, wherein the determining the first object distribution information corresponding to the first region according to the first object set comprises:

dividing the first object set into at least one first sub-object set according to object categories of objects in the first object set, wherein objects in each first sub-object set have a same object category;

determining a first frequency of an object category corresponding to each first sub-object set according to a quantity of the objects in each first sub-object set; and determining the first object distribution information according to the first frequency of the object category corresponding to each first sub-object set.

9. The method according to claim 7, wherein the determining the second object distribution information corresponding to the second region according to the second object set comprises:

dividing the second object set into at least one second sub-object set according to object categories of objects in the second object set, wherein objects in each second sub-object set have a same object category;

determining a second frequency of an object category corresponding to each second sub-object set according to a quantity of the objects in each second sub-object set; and determining the second object distribution information according to the second frequency of the object category corresponding to each second sub-object set.

10. The method according to claim 7, wherein the determining the object dependency information between the first region and the second region according to the first object set and the second object set comprises:

determining at least one first object category existing in the first object set and a first category quantity of the at least one first object category;

determining at least one second object category existing in the second object set and a second category quantity of the at least one second object category;

determining an object relationship between the at least one first object category and the at least one second object category in a total region, wherein the total region comprises the first region and the second region; and determining the object dependency information according to the first category quantity, the second category quantity and the object relationship.

11. The method according to claim 2, wherein the determining the object dependency information between the first region and the second region according to the first object set and the second object set comprises:

determining at least one first object category existing in the first object set and a first category quantity of the at least one first object category;

determining at least one second object category existing in the second object set and a second category quantity of the at least one second object category;

determining an object relationship between the at least one first object category and the at least one second object category in a total region, wherein the total region comprises the first region and the second region; and determining the object dependency information according to the first category quantity, the second category quantity and the object relationship.

12. The method according to claim 1, wherein the determining the object dependency information between the first region and the second region according to the first object set and the second object set comprises:

determining at least one first object category existing in the first object set and a first category quantity of the at least one first object category;

determining at least one second object category existing in the second object set and a second category quantity of the at least one second object category;

determining an object relationship between the at least one first object category and the at least one second object category in a total region, wherein the total region comprises the first region and the second region; and determining the object dependency information according to the first category quantity, the second category quantity and the object relationship.

13. The method according to claim 12, wherein the object relationship comprises:

first attraction of each first object category to each second object category;

second attraction of each second object category to each first object category;

a first dependency relationship of each first object category to each second object category;

a second dependency relationship of each second object category to each first object category.

14. The method according to claim 13, wherein the determining the first attraction of each first object category to each second object category comprises:

determining a first object quantity corresponding to each first object category and a second object quantity corresponding to each second object category comprised in the total region;

acquiring a total object quantity of objects comprised in the total region;

acquiring a third object quantity of neighbor objects of each first object in each first object category, wherein distances between the first object and the neighbor objects of the first object is less than or equal to a preset threshold;

acquiring a fourth object quantity of objects whose object category is the first object category among the neighbor objects of each first object in each first object category;

acquiring a fifth object quantity of objects whose object category is the second object category among the neighbor objects of each first object in each first object category; and determining the first attraction of each first object category to each second object category according to the first object quantity, the second object quantity, the total object quantity, the third object quantity, the fourth object quantity and the fifth object quantity.

15. The method according to claim 13, wherein the determining the first dependency relationship of each first object category to each second object category comprises:

determining a data map corresponding to each first object category and each second object category according to a supply relationship between each first object category and each second object category, wherein the data map comprises a node set and a directed edge set, the node set comprises each first object category and each second object category, and the directed edge set comprises a directed edge between the at least one first object category and the at least one second object category; and obtaining the first dependency relationship of each first object category to each second object category by processing the directed edge set using a preset algorithm.

16. The method according to claim 1, wherein the determining the object dependency information between the first region and the second region according to the first object set and the second object set comprises:

determining at least one first object category existing in the first object set and a first category quantity of the at least one first object category;

determining at least one second object category existing in the second object set and a second category quantity of the at least one second object category;

determining an object relationship between the at least one first object category and the at least one second object category in a total region, wherein the total region comprises the first region and the second region; and determining the object dependency information according to the first category quantity, the second category quantity and the object relationship.

17. The method according to claim 1, wherein the method further comprises:

performing at least one of the following operations on the first region and the second region according to the symbiosis:

updating maps of the first region and the second region;

updating traffic scheduling information corresponding to the first region and the second region;

determining a target location corresponding to a target object in the first region and the second region, wherein the target object is an object to be added in at least one of the first region and the second region.

18. An electronic device comprising:

at least one processor; and a memory in communicational connection with the at least one processor; wherein, the memory stores instructions executable by the at least one processor, and the instructions are executed by the at least one processor to enable the at least one processor to:

acquire a first distance between a first region and a second region, a first object set comprised in the first region, and a second object set comprised in the second region;

determine spatial dependency information between the first region and the second region according to the first distance;

determine object dependency information between the first region and the second region according to the first object set and the second object set; and determine a symbiosis between the first region and the second region according to the spatial dependency information and the object dependency information;

wherein the at least one processor is further configured to:

if the first distance is less than or equal to a preset distance, determine that the spatial dependency information is preset information; and if the first distance is greater than the preset distance, acquire a first area of the first region and a second area of the second region, and determine the spatial dependency information between the first region and the second region according to the first area, the second area, the first object set, the second object set and the first distance.

19. A non-transitory computer-readable storage medium having computer instructions stored thereon, wherein the computer instructions are used to cause a computer to:

acquire a first distance between a first region and a second region, a first object set comprised in the first region, and a second object set comprised in the second region;

determine spatial dependency information between the first region and the second region according to the first distance;
determine object dependency information between the first region and the second region according to the first object set and the second object set; and
determine a symbiosis between the first region and the second region according to the spatial dependency information and the object dependency information;
wherein the computer is further configured to:
if the first distance is less than or equal to a preset distance, determine that the spatial dependency information is preset information; and
if the first distance is greater than the preset distance, acquire a first area of the first region and a second area of the second region, and determine the spatial dependency information between the first region and the second region according to the first area, the second area, the first object set, the second object set and the first distance.

* * * * *